United States Patent
Takeshita

(10) Patent No.: US 8,451,110 B2
(45) Date of Patent: May 28, 2013

(54) SEAT BELT WARNING APPARATUS AND SEAT BELT WARNING METHOD

(75) Inventor: Kouhei Takeshita, Shimada (JP)

(73) Assignee: Yazaki Corporation, Tokyo (JP)

( * ) Notice: Subject to any disclaimer, the term of this patent is extended or adjusted under 35 U.S.C. 154(b) by 368 days.

(21) Appl. No.: 12/999,653

(22) PCT Filed: Jun. 16, 2009

(86) PCT No.: PCT/JP2009/060966
§ 371 (c)(1),
(2), (4) Date: Dec. 17, 2010

(87) PCT Pub. No.: WO2009/154210
PCT Pub. Date: Dec. 23, 2009

(65) Prior Publication Data
US 2011/0084828 A1    Apr. 14, 2011

(30) Foreign Application Priority Data
Jun. 20, 2008    (JP) .................. 2008-161595

(51) Int. Cl.
*B60Q 1/00* (2006.01)
*H01H 35/00* (2006.01)
*B60R 22/00* (2006.01)

(52) U.S. Cl.
USPC .................. 340/457.1; 200/85 R; 701/45

(58) Field of Classification Search
USPC .......... 340/457.1, 945, 438; 280/801; 200/85; 701/45
See application file for complete search history.

(56) References Cited

U.S. PATENT DOCUMENTS

| | | | |
|---|---|---|---|
| 5,483,221 A * | 1/1996 | Mutter et al. | 340/457.1 |
| 5,653,462 A * | 8/1997 | Breed et al. | 280/735 |
| 5,949,340 A * | 9/1999 | Rossi | 340/573.1 |
| 6,104,293 A * | 8/2000 | Rossi | 340/573.1 |
| 6,170,874 B1 * | 1/2001 | Fosse | 280/777 |
| 6,184,785 B1 * | 2/2001 | Midorikawa | 340/457.1 |
| 6,362,734 B1 | 3/2002 | McQuade et al. | |
| 2009/0212955 A1 * | 8/2009 | Schoenberg et al. | 340/573.1 |

FOREIGN PATENT DOCUMENTS

| | | |
|---|---|---|
| EP | 0653337 A2 | 5/1995 |
| JP | 63-192640 A | 8/1988 |
| JP | 7-186887 A | 7/1995 |
| JP | 2002-79910 A | 3/2002 |

OTHER PUBLICATIONS

International Search Report (PCT/ISA/210) issued Aug. 11, 2009, in PCT/JP2009/060966.
Extended European Search Report issued on May 19, 2011 in counterpart European Application No. 09766658.0.

* cited by examiner

*Primary Examiner* — Benjamin C Lee
*Assistant Examiner* — Sigmund Tang
(74) *Attorney, Agent, or Firm* — Sughrue Mion, PLLC

(57) ABSTRACT

To provide with a seat belt warning apparatus capable of stopping the operation of a buzzer, for example, when a passenger has moved from a rear seat to another seat, such as a front passenger's seat, and fastens the seat belt, the seat belt warning apparatus outputs a notice when the number of seats where seat belts are fastened except a driver's seat is reduced, and stops the output of the notice when the number of seats where the seat belts are fastened except the driver's seat is equal to or more than that when the notice is output.

2 Claims, 4 Drawing Sheets

SEAT BELT WARNING APPARATUS AND SEAT BELT WARNING METHOD

TECHNICAL FIELD

The present invention relates to a seat belt warning apparatus and a seat belt warning method that give a warning when a seat belt of a vehicle is not fastened.

BACKGROUND ART

The various warning methods have been proposed which give a warning when a seat belt is not fastened (for example, see Patent Literature 1 or Patent Literature 2). FIG. 3 is a system block diagram illustrating an example of the warning method according to the related art. As shown in FIG. 3, a warning apparatus according to the related art includes an ignition key switch 10 that controls the driving and stopping of an engine, a seat sensor 20 that detects whether a passenger is sitting on the seat, seat belt switches 30 that detect whether the seat belts are fastened as on/off states, a CPU (that is, a Central Processing Unit) 40, LEDs (that is, Light Emitting Diodes) 50 that give a seat belt warning generated on the basis of a control command from the CPU 40, and a buzzer 60 that makes a warning sound.

The seat belt warning apparatus having the above-mentioned structure according to the related art controls the output of a warning for the driver's seat by a combination of the start-up (IGN+10) of the engine and the seat belt switches 30. That is, when the engine has started up and the seat belt switch 30 indicates that the seat belt is not fastened, the seat belt warning apparatus gives a warning. Meanwhile, the seat belt warning apparatus gives a warning for the front passenger's seat by a combination of the seat sensor 20 and the seat belt switches 30, and gives a warning for the rear seats using the seat belt switches 30. The CPU 40 periodically detects the state of the seat belt switch 30 and stores the state in a seat belt flag (register) 100 of the CPU 40. Therefore, when any one of the seat belts of the rear seats is changed from a fastened state to an unfastened state, an LED corresponding to the rear seat is turned on to display the unfastened state of the seat belt and simultaneously, the buzzer 60 sounds to notify the unfastened state, as shown in FIG. 4.

CITATION LIST

[PTL 1] JP-A-63-192640 (pp. 2 to 5 and FIG. 1)
[NPL 1] JP-A-7-186887 (pp. 2 and 3, and FIG. 2)

SUMMARY OF INVENTION

Technical Problem

However, in the seat belt warning method according to the related art, when a passenger who is sitting on any one of the rear seats unfastens the seat belt and fastens the seat belt on the same rear seat again, it is possible to stop the operation of the buzzer 60. However, when the passenger moves from any one of the rear seats to another rear seat and fastens the seat belt on the rear seat, or when the passenger moves from the rear seat to another seat, such as the front passenger's seat, and fastens the seat belt, the buzzer sounds for a predetermined period of time. Therefore, even though the passenger fastens the seat belt, an unnecessary warning operation is continuously performed, which is inconvenient.

The invention has been made in order to solve the above-mentioned problems, and an object of the invention is to provide a seat belt warning apparatus and a seat belt warning method capable of stopping an unnecessary operation of a buzzer, for example, when a passenger moves from a rear seat to another seat, such as a front passenger's seat or another rear seat, except a driver's seat and fastens a seat belt.

Solution to Problem

In order to achieve the object, according to a first aspect of the invention, a seat belt warning apparatus includes: a plurality of seat belt switches each of which is provided in each of a plurality of seats having seat belts and indicates whether each of the seat belts are fastened as on/off states; a storage unit; a control unit that stores flag groups in the storage unit, the flag group being corresponded to a plurality of successive points of time and identifying whether each of the seat belts is fastened based on on/off states of each of the plurality of seat belt switches in the storage unit; and a notification unit that performs a notifying operation under the control of the control unit, wherein the control unit compares a first flag group for each of the plurality of seat belt switches stored in the storage unit at a first point of time with a second flag group for each of the plurality of seat belt switches stored in the storage unit at a second point of time after the first point of time, and directs the notification unit to output a notice when it is determined that the number of seats where the seat belts are fastened except a driver's seat is reduced; then the control unit compares the second flag group for each of the plurality of seat belt switches stored in the storage unit at the second point of time with a third flag group for each of the plurality of seat belt switches stored in the storage unit at a third point of time after the second point of time, and directs the notification unit to stop the output of the notice when it is determined that the number of seats where the seat belts are fastened except the driver's seat is equal to or more than that when the notification unit outputs the notice.

According to the seat belt warning apparatus of the first aspect, the unnecessary operation of the buzzer stops, for example, when the passenger moves from the rear seat to another seat, such as the front passenger's seat, and fastens the seat belt. Therefore, this structure is suitable for safety and it is possible to give a warning to the passenger without a sense of discomfort or a sense of incongruity.

In addition, in order to achieve the object, according to a second aspect of the invention, a seat belt warning method includes: a notification step of outputting a notice when the number of seats where seat belts are fastened except a driver's seat is reduced; and a stopping step of stopping the output of the notice when the number of seats where the seat belts are fastened except the driver's seat is equal to or more than that when the notice is output in the notification step.

According to the seat belt warning method of the second aspect, the unnecessary operation of the buzzer stops, for example, when the passenger moves from the rear seat to another seat, such as the front passenger's seat, and fastens the seat belt. Therefore, this structure is suitable for safety and it is possible to give a warning to the passenger without a sense of discomfort or a sense of incongruity.

Advantageous Effects of Invention

According to the invention, the operation of the buzzer stops in the middle of the process, for example, when the passenger moves from the rear seat to another seat, such as the front passenger's seat, and fastens the seat belt. Therefore, this structure is suitable for safety and it is possible to give a warning to the passenger without a sense of discomfort or a sense of incongruity.

The invention has been described briefly above. The details of the invention will become apparent by reading exemplary embodiments of the invention from beginning to end with reference to the accompanying drawings.

DESCRIPTION OF EMBODIMENTS

Hereinafter, a seat belt warning method according to an embodiment of the invention will be described in detail with reference to the accompanying drawings.

Figure 1:
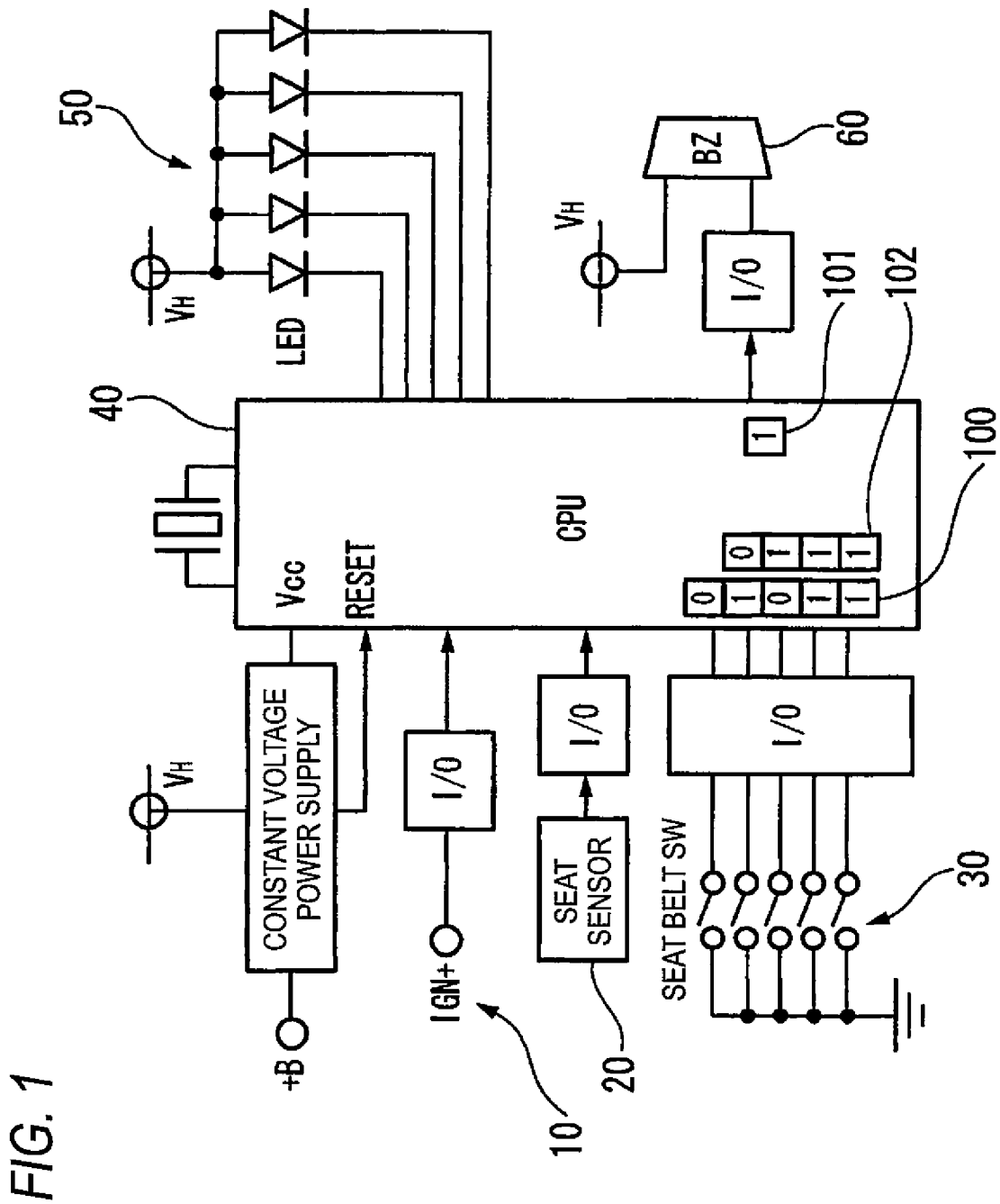
FIG. 1 is a system block diagram illustrating a seat belt warning method according to an embodiment of the invention.

FIG. 1 is a system block diagram illustrating the seat belt warning method according to the embodiment of the invention. In FIG. 1, a seat belt warning apparatus according to the embodiment of the invention includes an ignition key switch 10 that controls the driving and stopping of an engine, a seat sensor 20 that detects whether the passenger is sitting on the seat, seat belt switches 30 that indicate whether the seat belts are fastened as an on/off state, a CPU 40, LEDs 50 that give a seat belt warning generated on the basis of a control command from the CPU 40, and a buzzer 60 that makes a warning sound.

In the seat belt warning apparatus according to the embodiment of the invention, the CPU 40 periodically detects the states of the seat belt switches 30 and stores the detected states in a seat belt flag group A (register) 100 of the CPU 40. In FIG. 1, the seat belt flag group A 100 includes five flags, which correspond to the fastening states of a driver's seat belt, a front passenger's seat belt, and three rear seat belts indicated by the seat belt switches 30 of the seats from the upper side to the lower side. The CPU 40 includes a buzzer flag (register 101) that is set when the buzzer starts to sound and a seat belt flag group B 102 that indicates the fastening states of the seat belts when the buzzer flag 101 is set. In FIG. 1, the uppermost flag is omitted in the seat belt flag group B 102, as compared to the seat belt flag group A 100, which means that the seat belt flag group B 102 for the driver's seat is not provided. One flag of the seat belt flag group B 102 is omitted because the movement of the passenger to the driver's seat during driving is not considered. However, the seat belt flag group A 100 indicates the fastening states of the seat belts at the present time. Therefore, when a certain seat belt is not fastened, a flag "1" is set. On the other hand, when a certain seat belt is fastened, a flag "0" is set. For the buzzer flag 101, when the buzzer 60 starts to sound, a flag "1" is set. On the other hand, when the buzzer 60 stops sounding, a flag "0" is set.

Figure 2:
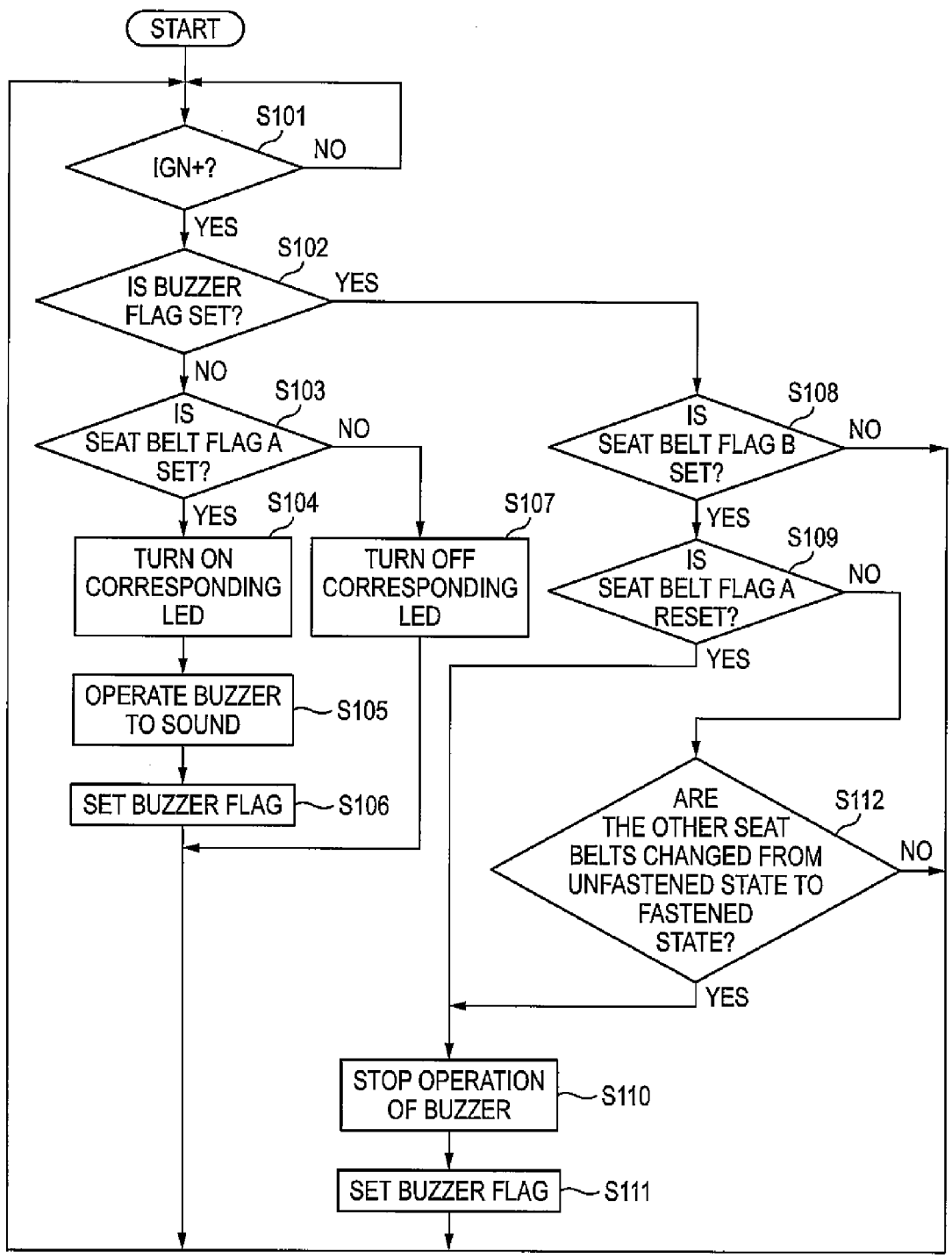
FIG. 2 is a flowchart illustrating the procedure of the seat belt warning method according to the embodiment of the invention.
Figure 3:
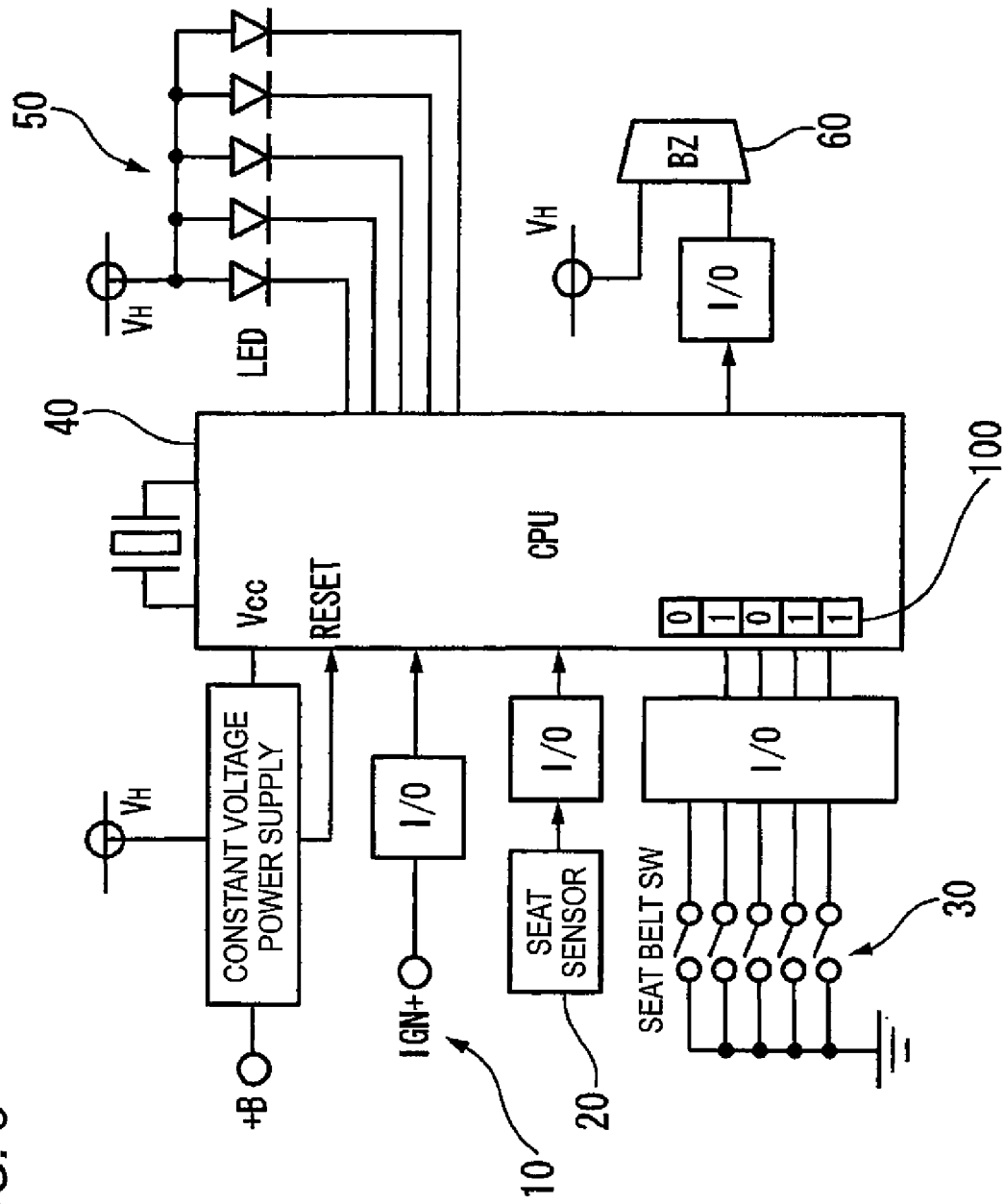
FIG. 3 is a system block diagram illustrating a seat belt warning method according to the related art.
Figure 4:
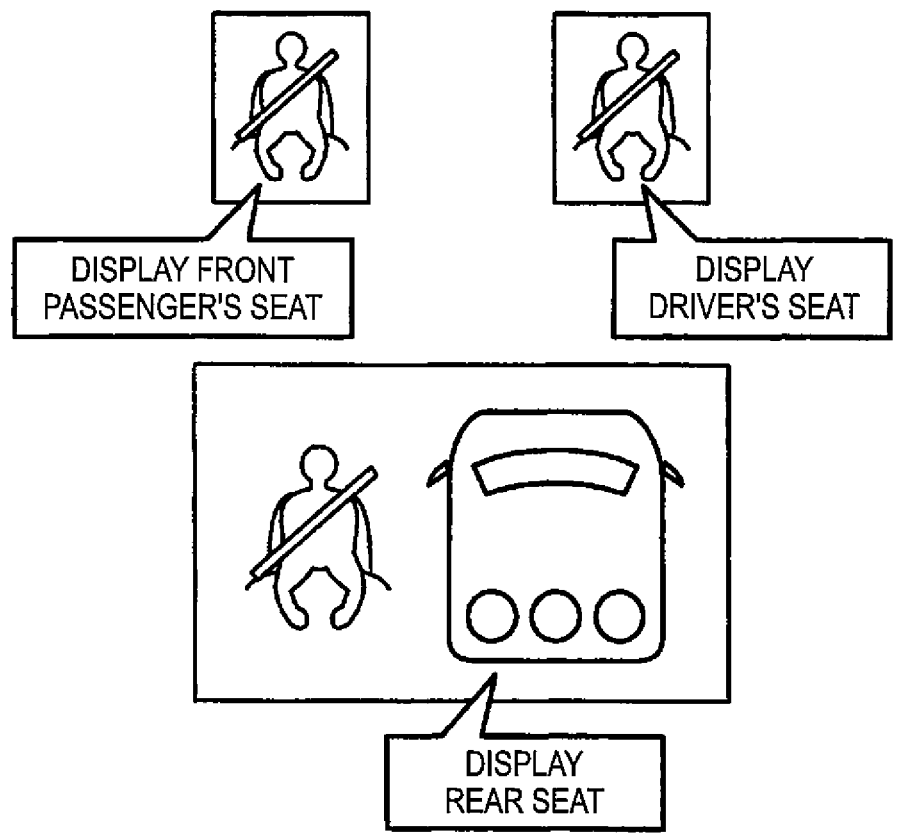
FIG. 4 is a diagram schematically illustrating an example of the notification (display) of the seat belt warning method according to the related art.

FIG. 2 is a flowchart illustrating the procedure of the seat belt warning method according to the embodiment of the invention. First, the CPU 40 determines whether the engine has started up on the basis of the state of the ignition key switch 10 (Step S101). When it is determined that the engine has started up, the CPU 40 determines whether the buzzer flag 101 is set to "1" (Step S102).

When the buzzer flag 101 is not set to "1" (Step S102; No), the CPU 40 determines whether there is a seat having the seat belt flag group A 100 set to "1" (Step S103). In this case, when there is a rear seat having the flag that has been changed from "0" to "1" among the flags of the seat belt flag group A 100, the CPU 40 turns on the LED 50 of the seat (Step S104) and simultaneously operates the buzzer 60 to sound (Step S105). In addition, at that time, the CPU 40 writes information indicated by the seat belt flag group A 100 to the seat belt flag group B 102 and sets the buzzer flag 101 to "1" (Step S106). When there is no rear seat having the flag set to "1" among the flags of the seat belt flag group A 100 in Step S103, the LED 50 is not turned on (Step S107) and the buzzer flag 101 is maintained at "0".

It is possible to notify the driver that the driver's seat belt or the front passenger's seat belt is not fastened using the method according to the related art using a combination of the ignition key switch 10 and the seat sensor 20, as described above.

When the buzzer flag 101 is set to "1" in Step S102, that is, during the generation of a warning sound from the buzzer, the CPU 40 performs the following determining operation on each seat (flag). First, the CPU 40 determines whether there is a seat having the seat belt flag group B 102 set to "1" (Step S108). The seat belt flag group B 102 indicates the fastening state of each seat belt (except the driver's seat belt) at the time when the buzzer starts to sound in Step S105. "1" is set to the flag corresponding to an unfastened seat belt and "0" is set to the flag corresponding to a fastened seat belt.

When there is a flag set to "1" among the flags of the seat belt flag group B 102, the CPU 40 determines whether the flag of the seat belt flag group A 100 corresponding to the seat having a flag set to "1" in the seat belt flag group B 102 is reset to "0" (Step S109). When the flag of a certain seat in the seat belt flag group B 102 is set to "1", but the flag of the seat in the seat belt flag group A 100 at the present time is set to "0", that is, the seat belt has changed from an unfastened state to a fastened state, it is considered that the passenger has refastened the seat belt. Therefore, when the flag of the seat in the seat belt flag group A 100 is reset to "0" (Step S109; Yes), the CPU 40 stops the operation of the buzzer 60 (Step S110), and resets the buzzer flag 101 to "0" (Step S111).

When the flag of the seat in the seat belt flag group B 102 is set to "1" and the flag of the seat in the seat belt flag group A 100 is not reset to "0" (Step S109; No), the CPU 40 determines whether there is a flag changed from "1" to "0" among the flags of the other seats in the seat belt flag group A 100, that is, whether there is a seat belt changed from an unfastened state to a fastened state (Step S112). For example, when the front passenger's seat belt is changed from an unfastened state to a fastened state after one of the rear seat belts is not fastened, it is considered that the passenger has moved from the rear seat to the front passenger's seat. In this case, it is determined that all passengers have fastened seat belts. Therefore, it is considered that requirements to give a warning using the buzzer 60 are reduced. Even when whether there is a flag changed from "1" to "0" among the flags of the other seats in the seat belt flag group A 100, that is, a change from the unfastened state to the fastened state is confirmed (Step S112; Yes), the CPU 40 proceeds to Step S110 to stop the operation of the buzzer 60 and resets the buzzer flag 101 to "0" (Step S111).

The main point of the process in Steps S109 and S112 is that the number of seats where the seat belts are fastened before the buzzer 60 sounds is compared with the number of seats where the seat belts are fastened after the buzzer 60 sounds. As another processing method, the number of flags set to "0" in the seat belt flag group A 100 (however, except the flag corresponding to the driver's seat) may be compared with the number of flags set to "0" in the seat belt flag group B 102. Conversely, the number of flags set to "1" in the seat belt flag group A 100 (however, except the flag corresponding to the driver's seat) may be compared with the number of flags set to "1" in the seat belt flag group B 102. In addition, in the embodiment of the invention, the CPU 40 detects a variation in the flags in the seat belt flag groups A and B with reference to the seat belt flag groups A and B stored in the register. However, the invention is not limited only to the structure in which the CPU detects the fastening states of the seat belts on the basis of the stored seat belt flag groups A and B. The CPU 40 may monitor the on or off states of the seat belt switches 30 in real time. When detecting that one of the seat belt switches 30 has changed from an on state (the state in which the seat belt is fastened) to an off state (the state in which the seat belt is unfastened), the CPU 40 may direct the notification unit to output a notice. Then, when detecting that any one of the seat belt switches 30 has changed from an off state to an on state, the CPU 40 may direct the notification unit to stop the output of the notice.

However, in this embodiment, only the operation of the buzzer stops, but the display of a notice using the LEDs that are considered not to give a sense of incongruity or a sense of discomfort is continuously performed. However, in this embodiment, the LED 50 is used as the notification unit using display, but the invention is not limited thereto. For example, an LCD or an organic EL device may be used for display.

The process from Step S101 to Step S112 is performed with a predetermined period. In addition, the process of the seat belt warning method is performed by executing a predetermined program with the CPU 40.

In the embodiment of the invention, when one of the seat belts switches 30 is changed from an on state to an off state and then any one of the seat belt switches 30 is turned on, the notifying operation stops. However, the notifying operation also stops when one of the seat belt switches 30 is changed from an on state to an off state and then a plurality of seat belt switches 30 is turned on. In particular, this case occurs when an additional passenger boards the vehicle. In this case, it is possible to stop the unnecessary operation of the buzzer.

The invention has been described in detail above with reference to a specific embodiment, but it will be understood by those skilled in the art that various modifications and changes of the invention can be made without departing from the scope and sprit of the invention.

Priority is claimed on Japanese Patent Application No. 2008-161595, filed on Jun. 20, 2008, the content of which is incorporated herein by reference.

REFERENCE SIGNS LIST

10: IGNITION KEY SWITCH
20: SEAT SENSOR
30: SEAT BELT SWITCH
40: CPU
50: LED
60: BUZZER
100: SEAT BELT FLAG GROUP A
101: BUZZER FLAG
102: SEAT BELT FLAG GROUP B

The invention claimed is:

1. A seat belt warning apparatus, comprising:
a plurality of seat belt switches each of which is provided in each of a plurality of seats having seat belts and indicates whether each of the seat belts are fastened as on/off states;
a storage unit;
a control unit that stores flag groups in the storage unit, the flag group being corresponded to a plurality of successive points of time and identifying whether each of the seat belts is fastened based on on/off states of each of the plurality of seat belt switches in the storage unit; and
a notification unit that performs a notifying operation under the control of the control unit,
wherein the control unit compares a first flag group for each of the plurality of seat belt switches stored in the storage unit at a first point of time with a second flag group for each of the plurality of seat belt switches stored in the storage unit at a second point of time after the first point of time, and directs the notification unit to output a notice when it is determined that the number of seats where the seat belts are fastened except a driver's seat is reduced;
then the control unit compares the second flag group for each of the plurality of seat belt switches stored in the storage unit at the second point of time with a third flag group for each of the plurality of seat belt switches stored in the storage unit at a third point of time after the second point of time, and directs the notification unit to stop the output of the notice when it is determined that the number of seats where the seat belts are fastened except the driver's seat is equal to or more than that when the notification unit outputs the notice.

2. A seat belt warning method comprising:
a determination step of determining, using a plurality of seat belt switches each provided in each of a plurality of seats having seat belts to indicate whether each seat belt is fastened, a number of seats where seat belts are fastened except a driver's seat;
a notification step of outputting a notice when the number of seats where seat belts are fastened except the driver's seat is reduced; and
a stopping step of stopping the output of the notice when the number of seats where the seat belts are fastened except the driver's seat is equal to or more than that when the notice is output in the notification step.

* * * * *